(12) United States Patent
Hood et al.

(10) Patent No.: US 8,131,832 B1
(45) Date of Patent: Mar. 6, 2012

(54) MESSAGE ENGINE SEARCHING AND CLASSIFICATION

(75) Inventors: Gavan W. Hood, Upper Lockyer (AU); Michael D. Kalan, Highland Heights, OH (US); Sujeet Chand, Brookfield, WI (US); Paul R D'Mura, Glendale, AZ (US); Kenwood H. Hall, Hudson, OH (US); Kenneth S. Plache, Scottsdale, AZ (US); Clifton H. Bromley, New Westminster (CA)

(73) Assignee: Rockwell Automation Technologies, Inc., Mayfield Hts., OH (US)

( * ) Notice: Subject to any disclaimer, the term of this patent is extended or adjusted under 35 U.S.C. 154(b) by 542 days.

(21) Appl. No.: 11/536,411

(22) Filed: Sep. 28, 2006

(51) Int. Cl.
*G06F 15/177* (2006.01)
*G06F 15/173* (2006.01)
*H04L 12/54* (2006.01)

(52) U.S. Cl. .................... 709/223; 709/220; 370/428

(58) Field of Classification Search .................... 709/224
See application file for complete search history.

(56) References Cited

U.S. PATENT DOCUMENTS

| | | | |
|---|---|---|---|
| 5,524,253 A | 6/1996 | Pham et al. | |
| 5,548,756 A | 8/1996 | Tantry et al. | |
| 5,812,394 A | 9/1998 | Lewis et al. | |
| 5,961,595 A | 10/1999 | Kawagoe et al. | |
| 6,034,970 A | 3/2000 | Levac et al. | |
| 6,820,249 B1 | 11/2004 | Jachmann et al. | |
| 6,868,538 B1 | 3/2005 | Nixon et al. | |
| 7,043,311 B2 | 5/2006 | Nixon et al. | |
| 7,058,712 B1 | 6/2006 | Vasko et al. | |
| 7,086,009 B2 * | 8/2006 | Resnick et al. ............... 715/771 |
| 7,089,530 B1 | 8/2006 | Dardinski et al. | |
| 7,096,465 B1 | 8/2006 | Dardinski et al. | |
| 7,580,423 B2 | 8/2009 | Anantha-Raju et al. | |
| 7,730,022 B2 | 6/2010 | Laub et al. | |
| 2002/0163520 A1 | 11/2002 | Hardin et al. | |
| 2002/0174262 A1 | 11/2002 | Marcos et al. | |
| 2003/0051053 A1 | 3/2003 | Vasko et al. | |
| 2003/0236576 A1 | 12/2003 | Resnick et al. | |
| 2004/0006401 A1 | 1/2004 | Yamada et al. | |

(Continued)

FOREIGN PATENT DOCUMENTS

DE  20016625 U1  12/2000

(Continued)

OTHER PUBLICATIONS

Cheah, et al. Institute of Electrical and Electronics Engineers: "Implementing Manufacturing Message Specification services and protocol using ISO Development Environment". Oct. 19, 1993. pp. 553-556.

(Continued)

*Primary Examiner* — Wing Chan
*Assistant Examiner* — David Yi
(74) *Attorney, Agent, or Firm* — Turocy & Watson, LLP; Alexander R. Kuszewski; John M. Miller

(57) ABSTRACT

The subject innovation provides for systems and methods that facilitate locating components of a unified plant model at runtime (e.g., specifying a search criteria), via a message engine that searches for modules/applications dynamically at run time. When a control module in a program needs to find another control module, a search can be performed by specifying a criteria and performing a search in the controller, via the message engine.

33 Claims, 13 Drawing Sheets

U.S. PATENT DOCUMENTS

| | | | |
|---|---|---|---|
| 2004/0158842 | A1 | 8/2004 | Gilfix et al. |
| 2005/0007249 | A1 | 1/2005 | Eryurek et al. |
| 2006/0026672 | A1* | 2/2006 | Braun .............................. 726/9 |
| 2006/0122812 | A1* | 6/2006 | Tinseth ........................ 702/188 |
| 2006/0149767 | A1* | 7/2006 | Kindsvogel et al. .......... 707/101 |
| 2006/0155578 | A1 | 7/2006 | Eisenberger et al. |
| 2006/0271939 | A1 | 11/2006 | Joris et al. |
| 2008/0034415 | A1* | 2/2008 | Chacko et al. .................. 726/14 |

FOREIGN PATENT DOCUMENTS

| | | | |
|---|---|---|---|
| EP | 0456249 | A2 | 11/1991 |
| EP | 1420316 | A1 | 5/2004 |
| EP | 1672872 | A1 | 6/2006 |
| EP | 1696376 | A | 8/2006 |
| WO | 03001334 | A2 | 1/2003 |

OTHER PUBLICATIONS

European Search Report for European Patent Application No. EP07117409 dated Jan. 24, 2008, 8 pages.

A. S. Tanenbaum: "Computer Networks" 2003, Pearson Education, US.

A. S. Tanenbaum: "Structured Computer Organization" 1999, Prentice-Hall, US.

European Search Report dated Feb. 7, 2008 for European Patent Application Serial No. EP 07 11 7361, 1 Page.

Herrick J. Johnson, "Each piece in its place" Unix Review, San Francisco, CA, US, vol. 5, No. 5, Jun. 1, 1987, pp. 66-75.

European Search Report dated Apr. 27, 2009 for European Patent Application Serial No. 07117357, 2 Pages.

OA dated Nov. 10, 2010 for U.S. Appl. No. 11/536,395, 39 pages.

OA mailed Feb. 2, 2011 for U.S. Appl. No. 11/536,269, 45 pages.

OA mailed Feb. 7, 2011 for U.S. Appl. No. 11/536,338, 47 pages.

A.S. Tanenbaum, "Computer Networks" 2003, Pearson Education, US. pp. 869-891.

A.S. Tanenbaum, "Structured Computer Organization" 1999, Prentice-Hall, US. pp. 653-669.

Final OA dated Apr. 27, 2011 for U.S. Appl. No. 11/536,395, 38 pages.

Final Office Action for U.S. Appl. No. 11/536,269, dated Aug. 18, 2011, 38 pages.

Final Office Action for U.S. Appl. No. 11/536,338, dated Aug. 4, 2011, 37 pages.

"Foundation Fieldbus Technical Overview", FD-043 Revision 3.0 2003, Fieldbus Foundation.

* cited by examiner

MESSAGE ENGINE SEARCHING AND CLASSIFICATION

CROSS REFERENCE TO RELATED APPLICATIONS

The subject application relates to co-pending applications filed on Sep. 28, 2006, Ser. No. 11/536,338 entitled "Distributed Message Engines and System"; Ser. No. 11/536,395 entitled "Message Engine"; Ser. No. 11/536,269 "Messaging Configuration System; the disclosures of which are hereby incorporated by reference as if fully set forth herein.

TECHNICAL FIELD

The subject invention relates to industrial control systems and, more particularly, to systems and methods that facilitate reliable messaging with and/or within an industrial environment.

BACKGROUND OF THE INVENTION

Electronic commerce, or e-commerce, generally refers to business conducted over an electronic medium such as the Internet (e.g., through the World Wide Web, or Web). Electronic commerce transactions typically are facilitated through applications such as web services, electronic shopping carts, file transfer protocol (FTP), secure FTP, electronic data interchange (EDI), email, and Universal Description, Discovery, and Integration (UDDI), among others. Electronic commerce transactions commonly are differentiated based on the type of trading partners that are interacting. For example, commerce between a business and a consumer generally is referred to as business-to-consumer (B2C) commerce, whereas commerce between businesses generally is referred to as business-to-business (B2B) commerce. Integration servers can be utilized to couple business and/or consumer trading partners and coordinate communication therebetween. By way of example, two businesses that employ disparate operating systems and/or applications can utilize an integration server to interact across internal and external networked computer systems.

In many instances, e-commerce can leverage information obtained from control systems or affect control systems. For example, a consumer purchasing an automobile through a dealer's web site may desire to know the lead time associated with building an automobile with a customized set of options. The dealer may query its manufacturing plants to ascertain whether an automobile with those options has been built or is going to be built. The result along with additional information can facilitate determining when such automobile will arrive at the distributor. If the purchaser decides to place a custom order (e.g., where there is no plan to build a car with the desired combination of options), the custom specification can be provided to the manufacturing plant and employed to automatically configure one or more control systems therein. For example, the customer may have specified the color green as the external color of the automobile. This data can be conveyed to a control system and utilized to automatically select a suitable paint gun (e.g., a paint gun associated with green paint) or green paint when the automobile is being assembled.

Control systems commonly employ one or more industrial controllers. A typical industrial controller is a special purpose processing device for controlling (e.g., via an automated and a semi-automated means) industrial processes, machines, manufacturing equipment, plants, and the like. Such controllers can execute a control program or routine in order to measure one or more process variables or inputs representative of a status of a controlled process and/or effectuate outputs associated with control of the process. For example, an output module can interface directly with a controlled process by providing an output from memory to an actuator such as a motor, drive, valve, solenoid, and the like. In distributed control systems, controller hardware configuration can be facilitated by separating the industrial controller into a number of control elements, each of which can perform a different function. Particular control modules needed for the control task can be connected together on a common backplane within a rack and/or through a network or other communications medium.

Various control modules can also be spatially distributed along a common communication link in several locations. Data can be communicated with these remote modules over a common communication link, or network, wherein any or all modules on the network communicate via a common and/or an industrial communications protocol. Controllers within a control system can communicate with each other, with controllers residing in other control systems or with systems or applications outside of a control environment (e.g., business related systems and applications).

Accordingly, information management such as message exchange using different protocols and configurations is becoming complex. For example, the mapping of information from production management to process control and custom glue code for integrating systems with different protocols and formats make configuration and management a difficult task. Moreover, failed communications (e.g., messages that are not received or acted upon), delayed responses (e.g., as a function of the time difference between a sent message and a re-send), and additional overhead (e.g., consumption of processing cycles to review stored notifications, schedule re-transmissions and re-send messages) further add to the problems involved.

SUMMARY

The following presents a simplified summary of the subject innovation in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation provides for systems and methods that facilitate locating components of a unified plant model at runtime (e.g., specifying a search criteria), via a message engine that searches for modules/applications dynamically at run time. Such message engine can further normalize messaging of various messaging protocols and formats, wherein various systems of such plant can map thereto—and provide a consistent interface where events are sent/received consistently across the system.

When a control module in a program needs to find another control module, a search can be performed by specifying a criteria and performing a search in the controller, via the message engine. In a related aspect, a built control system in conjunction and/or in place of a software system can be introduced to over lay the industrial system. Underneath such system there exists a common interface that is exposed (e.g., to indicate operating status), wherein the software can then search the system and locate the modules and determine actual events that are being published, and a status display can then be constructed as messages that meet the desired criteria are identified.

For example, an application that maintains an audit log for the system can search for and find every audit message generated by every module in the system and log such messages, even though such application typically does not have initial knowledge of modules available. Such search can be performed dynamically, so that as modules are being added or removed, the audit messages are updated accordingly. Hence, a search of modules can be performed dynamically at run time.

The subject innovation enables locating units at run time; such as the scenario wherein an equipment module talks to a plurality of control modules that can be located anywhere in the system (e.g., on a third party units) and the equipment module need not be aware of their location. Thus binding can occur at runtime. Moreover, the equipment module can then find desired control modules at run-time, or at deployment time. As another example, a material traceability application can discover available material and the manner that such material can be moved, and provide a model for industrial operation based in part on linkages provided among various application/modules, the manner the equipment is connected and the like; (and in general without a user explaining the industrial operation layout for the equipment module.)

In a related aspect linkage can be provided among a plurality of message engines, to provide real time interaction among the message engines/services. Moreover, the Message engine(s) can leverage directory and other Unified Plant Model (UPM) services to locate/search for other message engines and their configurations as well as supported messages. Such information can further reduce the glue code in configuring and managing the system as message engines can determine the appropriate mapping and routing of messages through the system. In addition, a common view to system information (e.g., for proprietary and third party legacy) with additional perspective(s) of messaging system can be provided. The message engine(s) activities can include: Filtering, Bridging, Routing, Propagation, Transformation and Monitoring of messages events in a customer's manufacturing system, for example. Also support can be provided for routing, data conversion, aggregation, and the like (e.g., third party and legacy systems can be integrated with public standards based interfaces.) Such a system can enable a cohesive assembly of manufacturing system to enable incremental integration of devices to the manufacturing system. Moreover, data mapping can be facilitated and higher level information interfaces (as compared to raw data interfaces) can be implemented. Additionally, a messaging system can be configured, deployed and managed based on quality of service metrics (e.g., data volume, turn around time, latency, redundancy, reliability and the like) from a common administration environment. Also messaging information can be presented in context with user scenario across the manufacturing system. For example, such UPM messaging infrastructure can support interfaces to proprietary interfaces and other third party products, to enable customers to manage heterogeneous environments that typically exist in plants. The core messaging infrastructure and interfaces to third party systems can be consistent across control, manufacturing execution system (MES) and enterprise resource planning (ERP) systems, thus minimizing complexity of configuration and management to customers. In a related aspect, search criteria can be supplied based on meta data that is published within the system. Modules can also be searched based on criteria related to Quality of Service (QoS). Additionally, search scopes can be automatically consolidated into a merged scope within a control system, due to common messaging infrastructure supplied by the message engine, for example.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
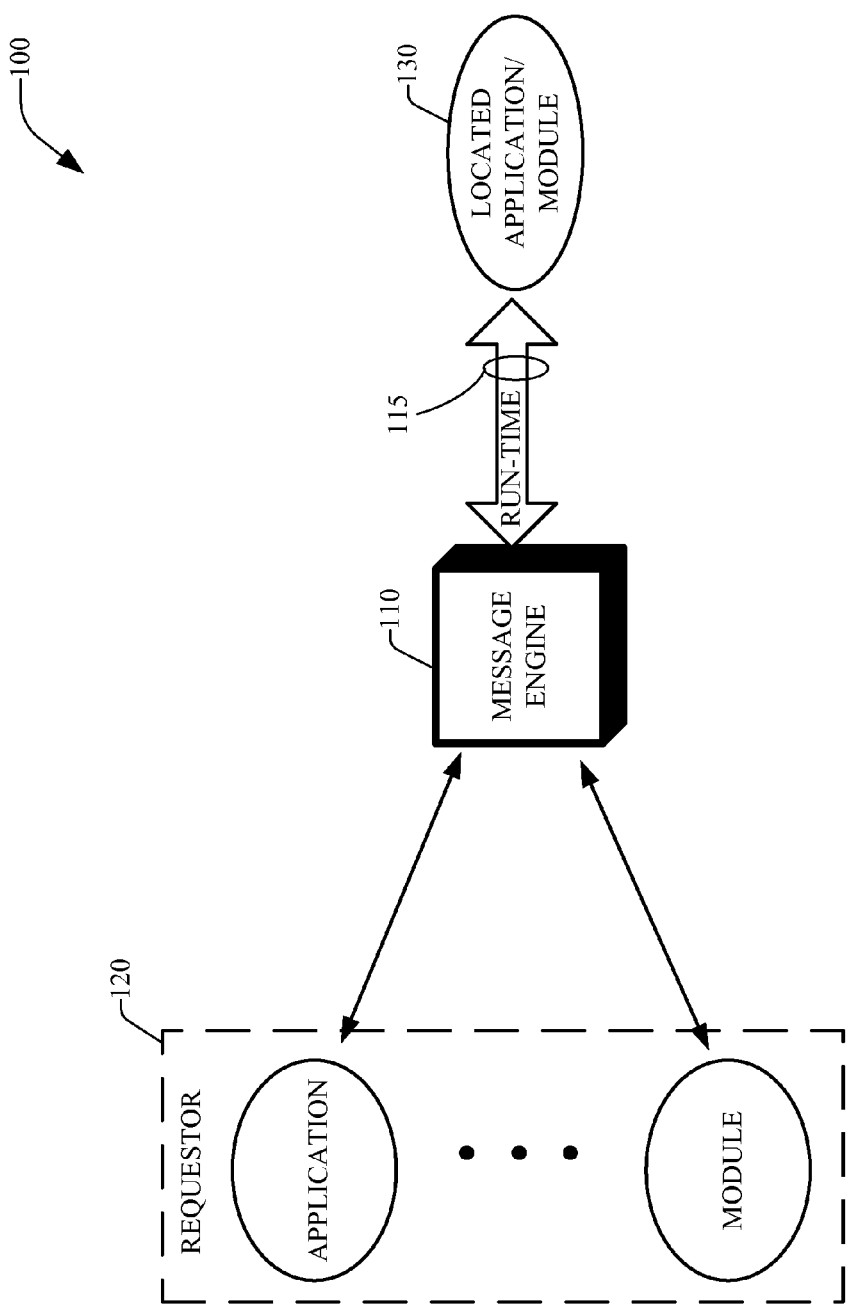
FIG. 1 illustrates an exemplary system that employs a message engine to facilitate locating components of a unified plant model at runtime.

The subject innovation is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "handler," "model," "system," and the like are also intended to refer to a computer-related entity, either hardware, a combination of hardware and software, software, or software in execution, in addition to electro mechanical units. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

FIG. 1 illustrates an exemplary system 100 that employs a message engine 110 to facilitate locating components of a unified plant model at runtime. A search criteria (e.g., a module name) can be supplied to the message engine to locate the desired components dynamically; and when a control module in a program needs to find another control module, at run time. In general, the term module can refer to a computer-related entity, either hardware, a combination of hardware and software, software, or software in execution, as well as an electro-mechanical component. For example, a module can be, but is not limited to, a process running on a processor, a processor, an object, an executable, a thread of execution, a program, and a computer. By way of illustration, an application running on a server and/or the server can be a module. In addition, a module can include one or more subcomponents. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices.

For example, a built control system in conjunction with and/or in place of a software system can be introduced to over lay the industrial system. Underneath such system there can exist a common interface that is exposed (e.g., to indicate operating status), wherein the software can then search the system and locate the modules and determine actual events that are being published, and a status display can then be constructed as messages that meet the desired criteria are identified.

The system 100 includes a message engine 110 that interacts with a requestor application/module 120 in order to locate a desired module/application 130 (e.g., request and receive data from such module/application.) The message engine 110 can provide the appropriate address (e.g., location) for the source of the module/application that is desired to be located at runtime 115.

For such location determination, the message engine 110 can employ various factors to make such a determination; e.g., the type of module that employs the message engine 110, the location of the requestor module/application 120 in a data driven architecture, the frequency of messages exchanged with the application/modules to be located, the format of the data and substantially any other attributes associated with the application/modules. Accordingly, the requestor module/application 120 can submit a request to the message engine 110 wherein such message engine then locates and provides the appropriate source thereto.

The system 100 enables locating units at run time; such as the scenario, wherein an equipment module talks to a plurality of control modules that can be located anywhere in the system (e.g., on a third party units) and the equipment module need not be aware of their location. Thus, binding can occur at run time, and the equipment module can then find desired control modules at run-time, or at deployment time. As another example, a material traceability application can discover available material and the manner that such material can be moved, and provide a model for industrial operation based in part on linkages provided among various application/modules, the manner the equipment is connected and the like; (and in general without a user explaining the industrial operation layout for the equipment module.)

The message engine 110 can receive information from any number of sources, with which the requestor application/module 120 interacts. For example, the message engine 110 can communicate with external devices, e.g., third party units located throughout a data driven architecture to receive information from various sources related to the control architecture of the system. Such information can be sent via a specific protocol or communication standard such as Ethernet, ControlNet, DeviceNet, Profibus, CAN bus or the like. Further, the communication can be accomplished via a wireless protocol such as wireless Ethernet, wireless LAN, Bluetooth, and the like.

The message engine 110 can further receive requests for an application/module identification and provide one or more data points based upon the request. Such data points can be located substantially anywhere within a data driven architecture. For example, a specific process point can be located in multiple locations throughout a data driven architecture. Such process point can be located at the source of the data for the desired application, at an industrial automation controller, a server and the like. Further, the data can have associated attributes that relate to visualization, transaction services, scaling, units and formatting of the data, for example. In this manner, the data attributes can provide needed information (e.g., metadata) to the message engine 110 in order to facilitate the proper processing, display, etc. of such data.

The message engine 110 can further be employed to allow a requestor (e.g., module, software application, user, and the like) to subscribe to a desired source. It is to be appreciated that the network can contain one or more memory mediums, processors, controllers (not shown), so that a particular data point can be stored in the network in multiple locations at substantially the same time. Further, each location can add one or more attributes to the data such the same data can be employed with a plurality of disparate subscribers to the data based upon the subscriber's requirements.

A listing of the desired applications/modules on a particular network can be displayed to a user via the message engine 110 in a nested directory structure such that data points associated with the desired application/modules are presented in a logical manner. The data points can be grouped based on various properties of the data such as physical location, function, output, process and the like. Moreover, data presentation can conform to a particular standard or format such as a Unified Plant Model (UPM) in accordance with the S88 standard, for example. Thus, each data point can be displayed as a single point even though the data point may be distributed throughout multiple locations (e.g., addresses) within a particular network.

Likewise, in a data driven architecture, a directory can be employed to provide a logical depiction to the user of the devices in the factory, for example. This logical UPM depiction can be tailored to the vernacular and plant organization of the customers industry. The directory function can translate the logical view of the factory into physical locations and addresses needed for the required data access and associations to take place.

Additionally, the message engine 110 can function as an intelligent coupling tool to effectively provide a particular data source to a subscriber wherein the subscriber can be provided a network address via a directory, for example. Such coupling can be transparent to the subscriber such that the subscriber is unaware of the address of the source of a requested data point. For instance, the subscriber can request a particular process point, wherein the value of the data can be delivered from any number of sources that have such a data value. The message engine 110 can utilize one or more factors to determine the address from which to retrieve the data such as the type of subscriber. For example, the subscriber can be a software application, an industrial controller, a user and the like. Thus, a software application can have different data requirements than an industrial controller and as such, the same data point can be provided from disparate addresses within a network.

It is to be appreciated that various algorithm(s) can be employed to help facilitate coupling an appropriate application/module that is being searched for, with an appropriate requestor application/module 120 via utilizing the message engine 110. For example, if the subscriber is an HMI, data with particular attributes can provide visualization formatting of the data. By way of further example, the requestor application/module 120 can be associated with a database (e.g., SQL Server, Oracle, etc.) that is employed with an ERP application; wherein the data can require particular metadata and formatting for insertion into a desired database field.

Figure 2:
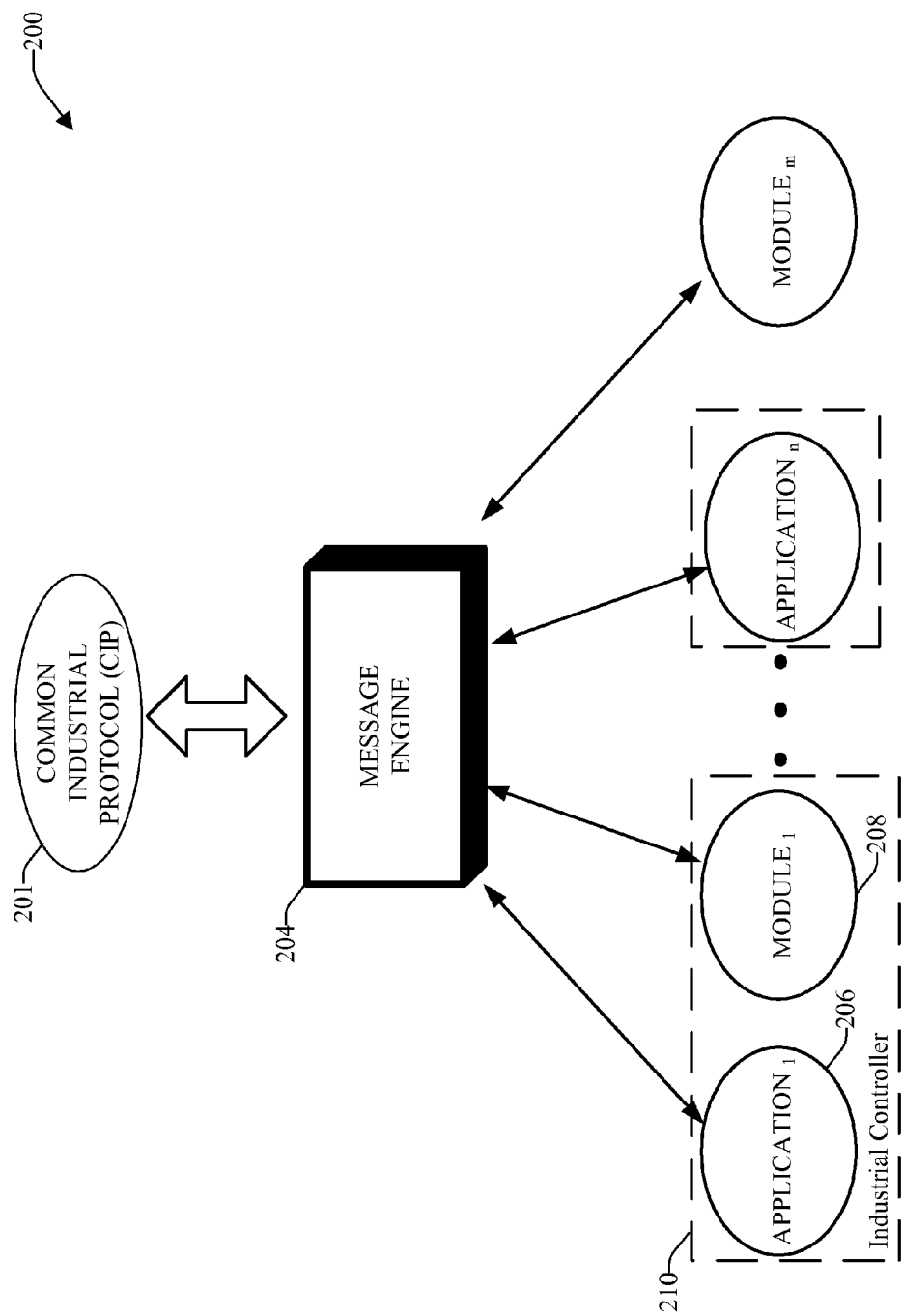
FIG. 2 illustrates a system that incorporates a message engine to normalize messages, in accordance with an aspect of the subject innovation.

As explained earlier the message engine of the subject innovation is further employed to normalize messaging of various messaging protocols and formats. FIG. 2 illustrates a system 200 that incorporates a message engine 204 in accordance to such message normalizing aspect of the subject innovation. The message engine 204 can provide a consistent interface, among a plurality of application(s) 206 and/or modules (s) 208, (m and n are integers), wherein events are sent/received consistently across the industrial plant. In general, the term module can refer to a computer-related entity, either hardware, a combination of hardware and software, software, or software in execution, as well as an electro-mechanical component. For example, a module can be, but is not limited to, a process running on a processor, a processor, an object, an executable, a thread of execution, a program, and a computer. By way of illustration, an application running on a server and/or the server can be a module. In addition, a module can include one or more subcomponents. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices.

Accordingly, the industrial controller(s) 210 that reside on the factory floor can interact with the message engine 204 to facilitate normalizing a communication based on a common industrial protocol 201. For example, the industrial controller 210 can be employed to control a certain cell/unit or procedure, which can be desirably tested and/or debugged. Particularly, the industrial controller 210 can include at least a portion of control logic that is employed to implement such procedures within the system. Moreover, the industrial controller 210 can be a programmable logic controller (PLC). PLCs are small computers that are employed for automating real-world processes (e.g., controlling machinery within an industrial environment). Typically, PLCs are microprocessor-based devices with modular or integral input/output circuitry, wherein such circuitry is utilized to monitor status of field connected sensor inputs, and is further utilized to control output actuators according to a logic program. While PLCs can be employed within the system 200 as an industrial controller, it is to be understood that any suitable industrial control device can be employed in connection with the subject invention. For example, any suitable microprocessor and/or microcontroller can be utilized within the system 200 as an industrial controller.

Figure 3:
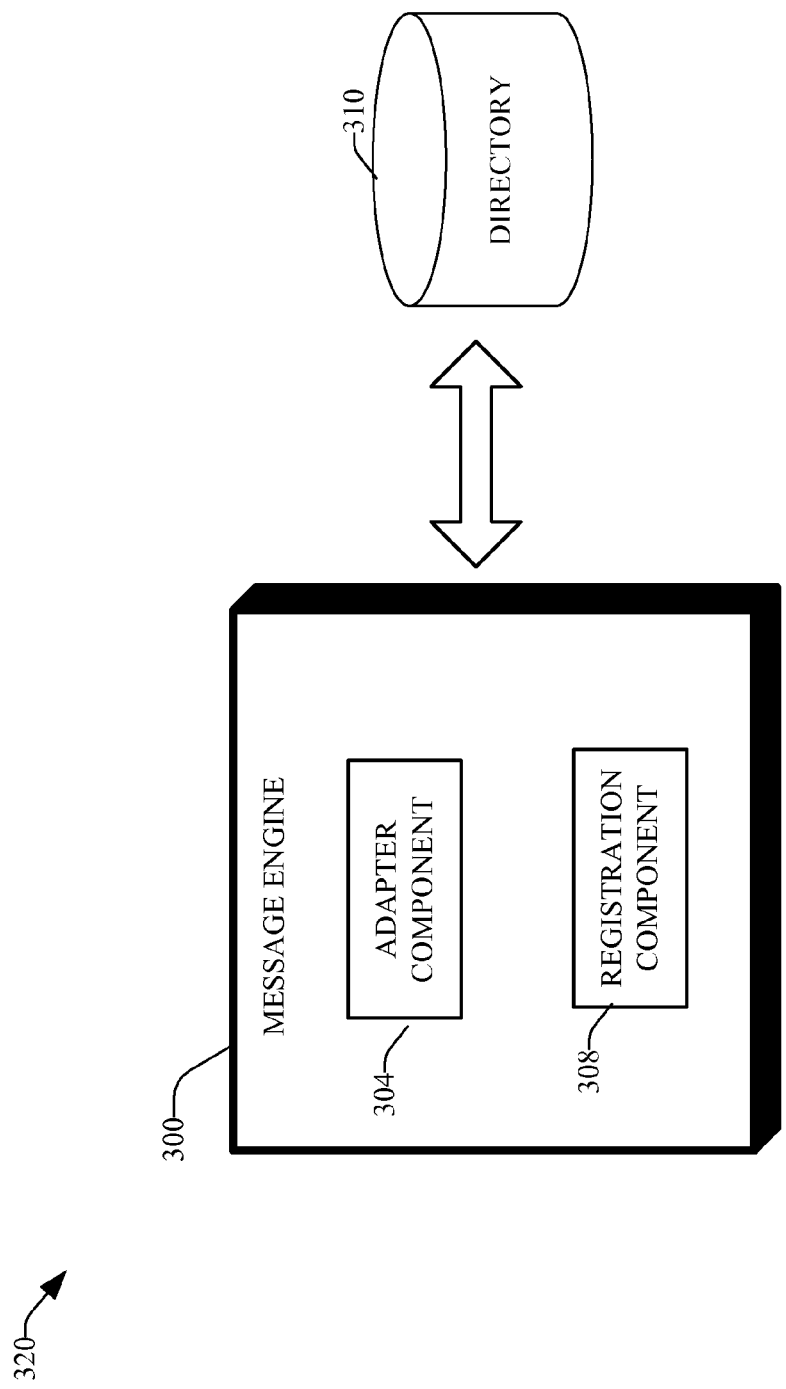
FIG. 3 illustrates a further aspect of the subject innovation, wherein an adapter is implemented as part of the message engine, in accordance with an aspect of the subject innovation.

FIG. 3 illustrates a further aspect of the subject innovation, wherein an adapter 304 is implemented as part of the message engine 300 to provide for communication with an OPC (Object Linking and Embedding—OLE interfaces that expose data from a variety of sources for process control) that can be hooked up to the message engine. Moreover, a registration component 308 can register applications/modules with the message engine, to facilitate locating them for a communication therebetween.

The registration component 308 can further interact with a directory 310 that can be employed in a data driven architecture. This directory 310 can provide a logical depiction to the user of the devices in the factory, e.g., based upon a Unified Plant Model (UPM) that is built upon industry standards such as S88, S95. Such logical UPM depiction can further be tailored to the vernacular and plant organization of the customers industry. The directory function can translate the logical view of the factory into physical locations and addresses needed for the required data access and associations to take place.

Additionally, in a data driven architecture the directory 310 can provide a logical view of the factory while resolving and/or providing necessary associations to physical location and/or device addressing information. The types of information required could include physical location of the data source/owner, physical location of the data subscriber, communications address for data source/owner and communications addresses for attributed data that can exist at multiple levels, for example.

When data is required, addressing and associations to that data can be made with the directory system 310. For example, the user can select the data using a logical UPM depiction of the plant. Depending upon the application requesting the data, as well as the role and requirements of the user, the directory interface can provide the appropriate addressing information to the required data. In some cases, such as automation device to automation device communications, the addressing might point directly to the data source/owner. In other cases, such as ERP human resources applications, the association may be to a proxy server of the attributed data so as to isolate the servicing of the data requests from the real time control processing of the automation device that is the data source. It is to be appreciated that the physical location associated with the data can be that of the data source/owner while the communication address may be that of some other device on the network that is performing the role of adding attributes to the data or acting as a proxy server for that data.

Attributes associated with data can be added as such data is distributed throughout a network. Data can be sent to one or more locations such as server or a proxy server (not shown). Accordingly, the location (e.g., address) of the data can be employed to determine various attributes associated with data from a particular data source. For example, data sent to server can provide attributes to data received such as formatting, schemas, scaling, factoring, units and the like. The attributed data sent from the server can be sent to additional locations such as proxy server wherein additional attributes can be associated with the data. Thus, data sent from a particular source can accumulate attributes as it is sent throughout a network architecture. Additionally, attributes can be substituted and/or reduced as data is directed to desired portions of a network. Data can be replicated such that identical copies of data (e.g., attributed, original, etc.) can be located on the same or disparate networks in multiple locations.

Figure 4:
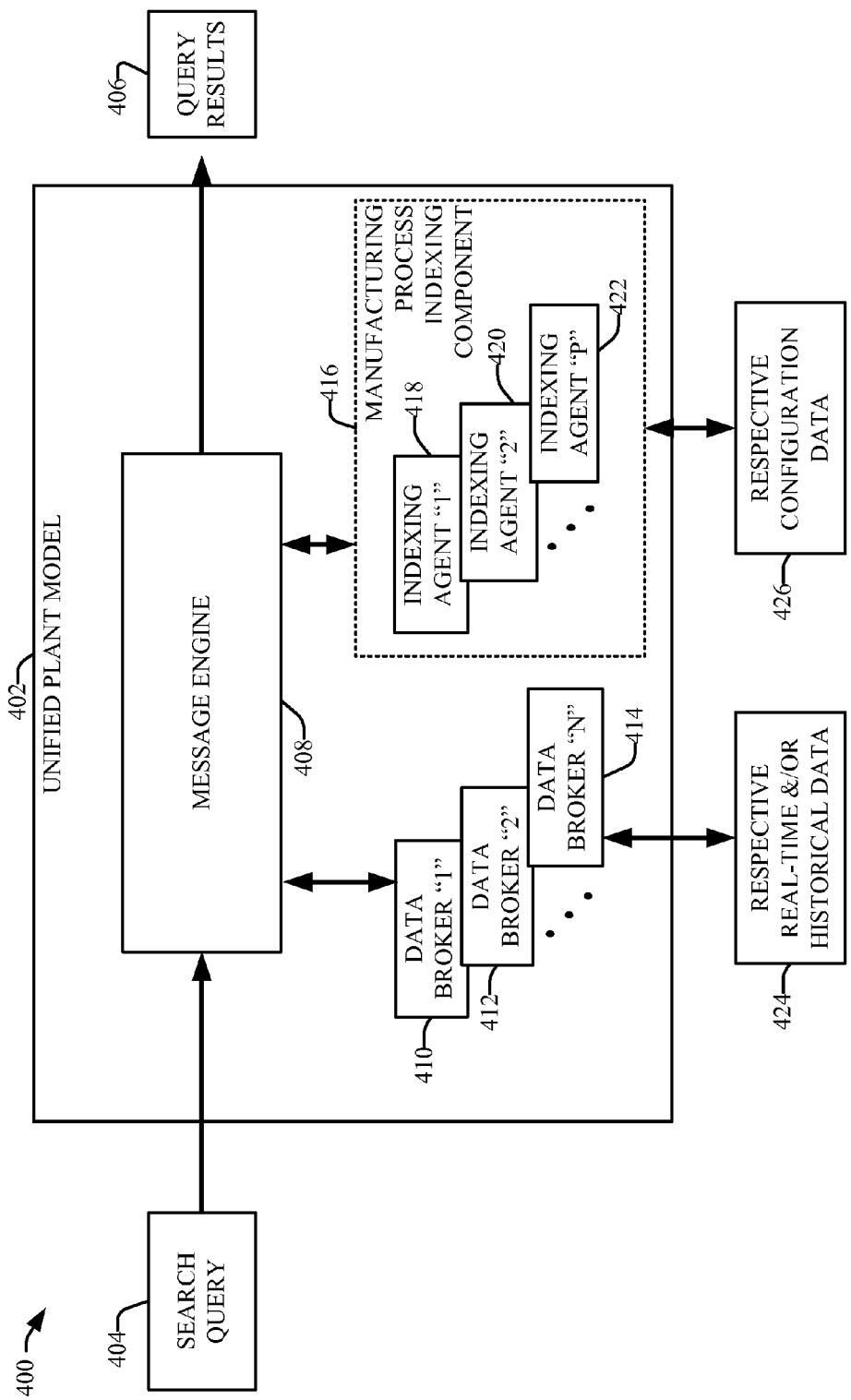
FIG. 4 illustrates a block diagram of a run-time search in accordance with an aspect of the subject innovation.

FIG. 4 illustrates a block diagram of a run-time search 400 in accordance with an aspect of the subject innovation. For example, when a control module in a program needs to find another control module, a search can be performed by specifying a criteria and performing a search in the unified plant model 402, via the message engine 408. Such message engine can receive a search query 404 and provide query results 406. The message engine 408 can interact with data brokers "1-N" 410-414, where "N" is an integer, and a manufacturing process indexing component 416. The manufacturing process indexing component 416 can be comprised of indexing agents "1-P" 418-422, where "P" is an integer.

The message engine 408 receives the search query 404, and depending on such search query 404, the message engine 408 can employ the sets of data brokers "1-N" 410-412 and/or the indexing agents "1-P" 418-422 to facilitate a search. In this example, the data brokers "1-N" 410-414 access respective real-time and/or historical data 424 as necessary to respond to a search request from the manufacturing process search message engine 408. The indexing agents "1-P" 418-422 can further be employed to facilitate in searching respective configuration data 426 to facilitate a search request from the message engine 408. The message engine 408 can combine returned search results into an aggregate list of objects and provides them as query results 406.

Moreover, the data brokers 410, 412, can maintains an audit log for the system and supply the message engine 408 an ability to search for and find every audit message generated by every module in the system and log such messages, even though such application typically does not have initial knowledge of modules available. Such search can be performed dynamically, so that as modules are being added or removed, the audit messages are updated accordingly. Hence, a search of modules by the message engine 408 can be performed dynamically at run time.

Figure 5:
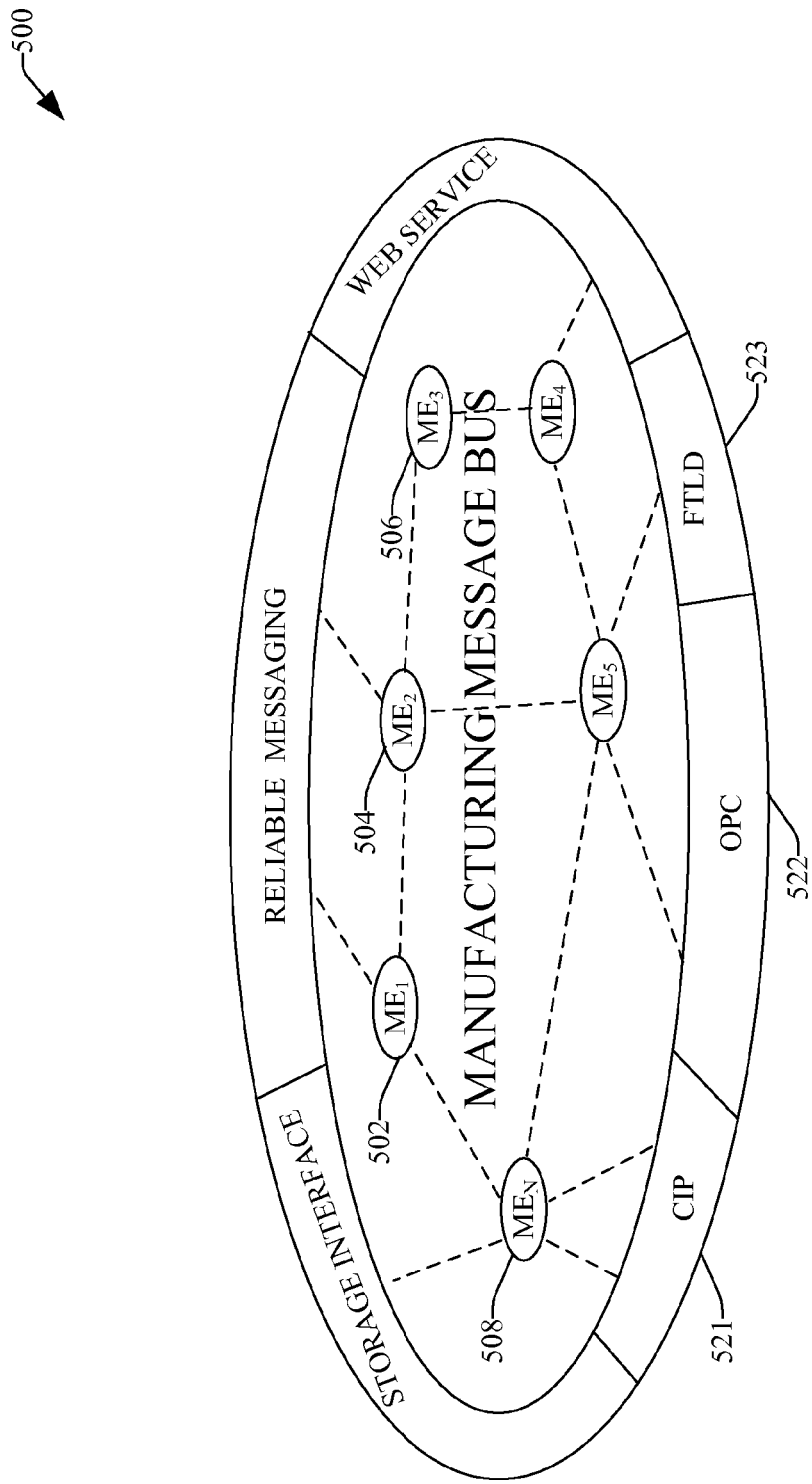
FIG. 5 illustrates a message exchange system with service interfaces to Unified Plant Model (UPM) message engines/manufacturing message bus in accordance with an aspect of the subject innovation.

FIG. 5 illustrates a message exchange system 500 with service interfaces to Unified Plant Model (UPM) message engines/manufacturing message bus in accordance with an aspect of the subject innovation. The message exchange system 500 can be constructed with multiple message engines (services) that can communicate via preferred channels to other services, and via open standards based interfaces to third party products. Connections between the message engines 502, 504, 506, 508 (1 to n, where n is an integer) can be further optimized with an information level messaging protocol that meet needs of customers that employ the subject innovation.

Applications 521, 522, 523 (OPC-OLE interfaces that expose data from a variety of sources for process control; Control & Information Protocol—CIP, Factory Talk Live Data) can interact with other applications via message constructs or services, as described in detail infra, which send and receive messages. Such message bus interactions can be aggregated into a plurality of scenarios. The message exchange services can provide a higher level interface to the message level interfaces allowing abstraction of applications from messages and conversely messages from applications. The manufacturing message bus supports a both message and service interfaces. Applications 521, 522, 523 can send and receive messages in different contexts; services allow applications to associate message processing functionality with messages in service operations.

In the message exchange system 500, messaging elements (Alarm messages, Command messages, Data replication, Event messages, Scenarios, and the like) can be configured in libraries and deployed to production systems, such deployment process can be consistent with a UPM library and deployment model. Accordingly, value of UPM messaging and scenarios can be extended by the delivery of predefined messages, services and message scenarios that are implemented by products related to the message exchange 500, and which can be leveraged by end users. End users can also define their own messages and message scenarios and deploy the library components using the common UPM deployment and versioning models.

Figure 6:
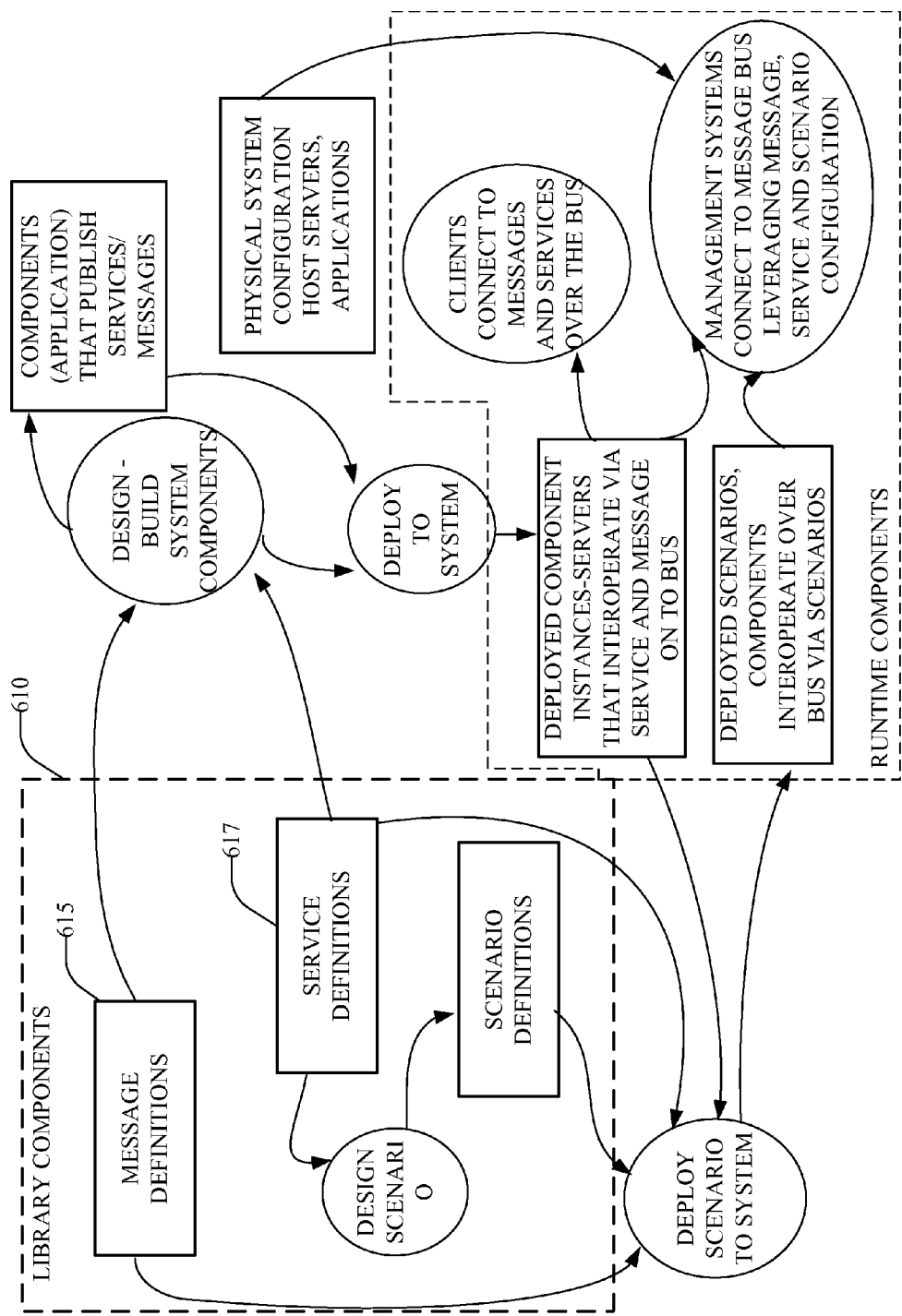
FIG. 6 illustrates exemplary library components that supply support for production system design/deployment process.

FIG. 6 illustrates exemplary library components that supply support for production system design/deployment process. Such library components 610 can be reverse engineered from deployed components (when allowed by security privileges.) Libraries contain logical definitions of messages, services and scenarios. Library components of message definitions 615 and service definitions 617 can be used to build scenario definitions. Applications (software products, control system programs, and the like) can employ such definitions to build solutions that send and receive messages, publish and connect to services and publish scenarios that are supported. Accordingly, application solutions can be deployed to production systems where they are bound to physical devices. Moreover, scenarios can be deployed to systems where they are bound to services and raw message interfaces supported by products in the system. In addition, scenarios can be extended to allow additional functionality to be provided typically without changing applications.

Furthermore, in a data driven architecture a directory can provide a logical view of the factory while resolving and/or providing necessary associations to physical location and/or device addressing information. The types of information required can include physical location of the data source/owner, physical location of the data subscriber, communications address for data source/owner and communications addresses for attributed data that can exist at multiple levels, for example.

When data is required, addressing and associations to that data can be made with the directory system. For example, the user can select the data using a logical UPM depiction of the plant. Depending upon the application requesting the data, as well as the role and requirements of the user, the directory interface can provide the appropriate addressing information to the required data. In some cases, such as automation device to automation device communications, the addressing can point directly to the data source/owner. In other cases, such as ERP human resources applications, the association can be to a proxy server of the attributed data so as to isolate the servicing of the data requests from the real time control processing of the automation device that is the data source. It is to be appreciated that the physical location associated with the data can be that of the data source/owner while the communication address may be that of some other device on the network that is performing the role of adding attributes to the data or acting as a proxy server for that data.

Figure 7:
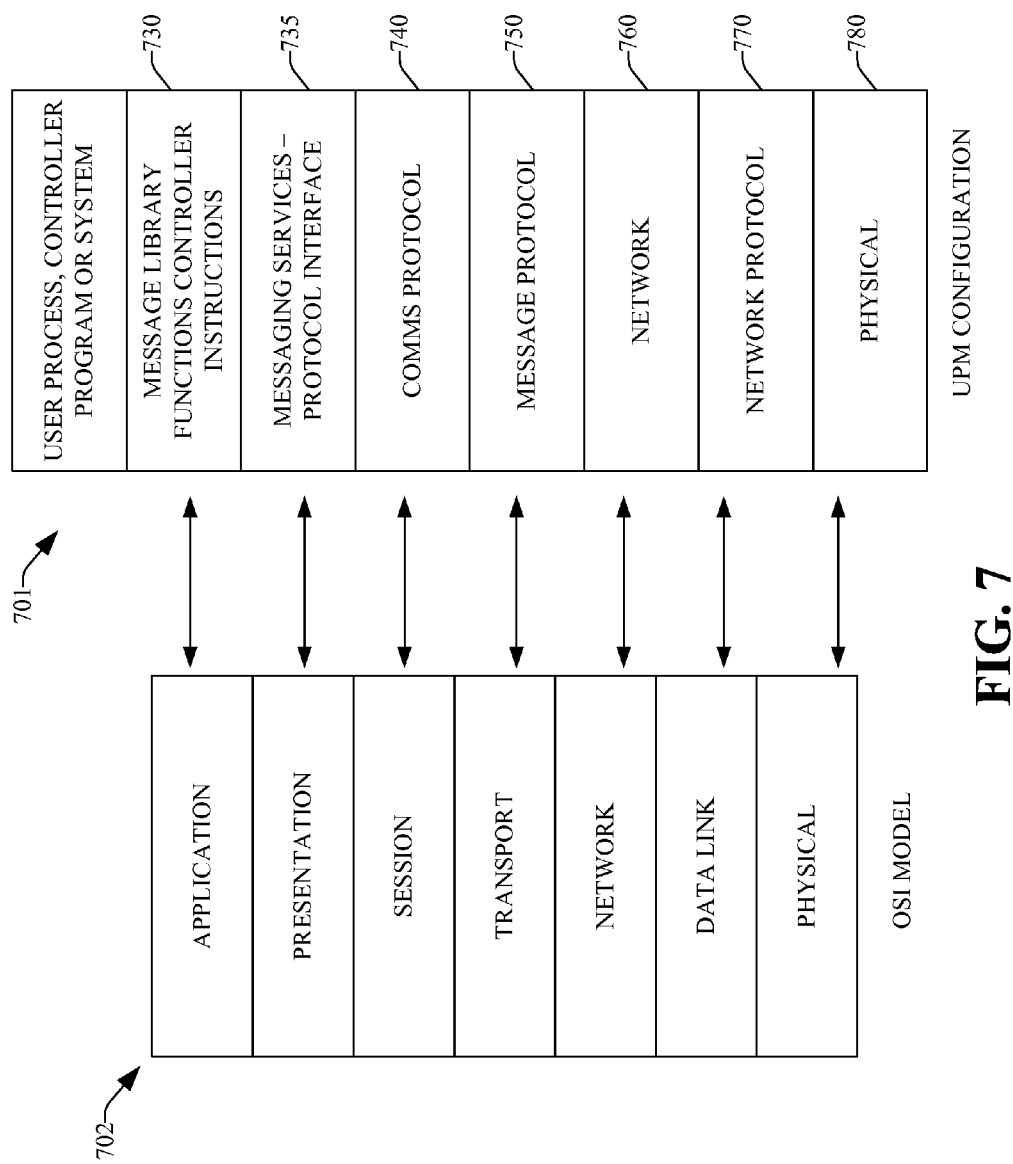
FIG. 7 illustrates a stacking arrangement for a UPM messaging protocol in comparison to the Open Systems Interconnect (OSI) model, in accordance with an aspect of the subject innovation.

FIG. 7 illustrates a stacking arrangement for a UPM messaging protocol 701 in comparison to the Open Systems Interconnect (OSI) model 702 in accordance with an aspect of the subject innovation. Stack 701 of the UPM messaging model incorporates user process, controller program or system that can invoke library functions/instructions for message exchange in accordance with an aspect of the subject innovation. The message library functions and controller instructions 730 can facilitate type conversions and exchange of messages with a message engine of the subject innovation. The messaging services protocol interfaces 735 manages data conversion and routes the message to other nodes or application objects. Likewise, stack 740 manages the communication protocol and present messages for delivery as well as receipt of messages. Moreover, stack 750 manages the message protocol that exchange data with other points. Stacks 760, 770, and 780 manage the network, network protocol and physical layer respectively for physical transmission of messages. Hence, message processing is partitioned to appropriate levels—e.g., the layering of message formats allows layers to focus on the functionality required at that level. Such communication includes tunneling down to any controller residing on any network (e.g., NetLinx, Control & Information Protocol (CIP), Data Highway Plus (DH+) based networks) to view, obtain and/or modify data, files, services and/or applications. The communication also provides for incremental updates to any file, service and/or application residing and/or executing within a controller or device. Such updates can be dynamic and mitigate any need for downloading new firmware to enhance functionality as well as provide revision management.

Figure 8:
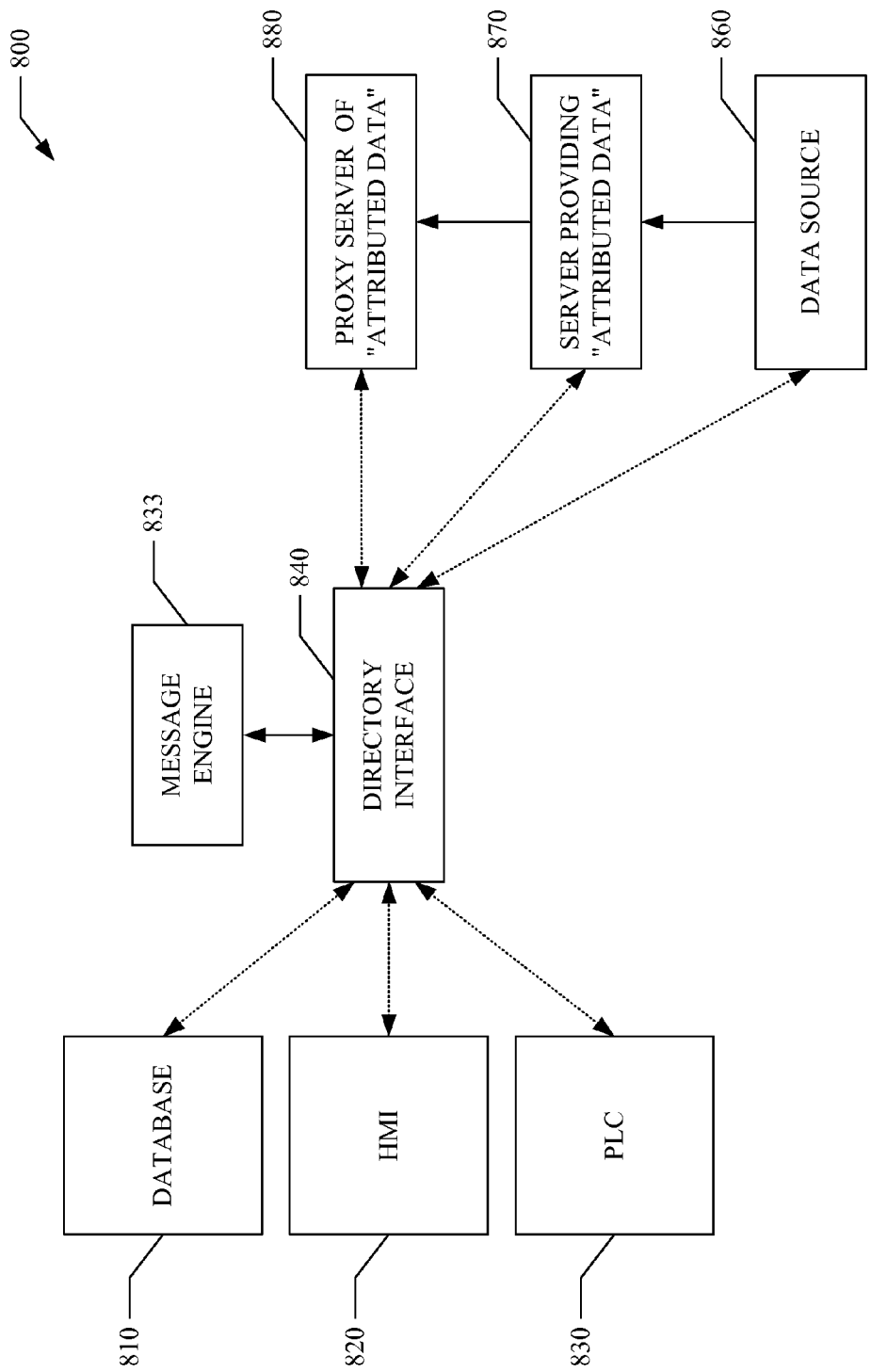
FIG. 8 illustrates an exemplary industrial automation network that employs a message engine to exchange messages.

FIG. 8 illustrates an exemplary industrial automation network that employs a message engine 833 to exchange messages and transfer data to: a database 810, a human machine interface (HMI) 820 and a programmable logic controller (PLC) 830 via a directory interface 840. The directory interface can include an AI component 850 to facilitate efficient identification of desired data within a particular network. The directory interface 840 can be employed to provide data from an appropriate location such as the data source 860, a server 870 and/or a proxy server 880. Accordingly, the directory interface 840 can point to a source of data based upon role and requirements of a requestor (e.g., database 810, HMI 820, PLC 830, and the like.) The database 810 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. Moreover, particular ERP applications can require data that has certain desired attributes associated therewith. Thus, in accordance with an aspect of the subject invention, the directory interface 840 can provide data to the database 810 from the server 870, which provides data with the attributes desired by the database 810.

As illustrated in FIG. 8, the message engine(s) 833 can leverage directory interface 840 and other UPM services to locate other message engines and their configurations as well as supported messages. Such information can further reduce the glue code in configuring and managing the system as message engines can determine the appropriate mapping and routing of messages through the system. In addition, a common view to system information (e.g., for proprietary and third party legacy) with additional perspective(s) of messaging system can be enabled via such message engine. The message engine(s) activities can facilitate: Filtering, Bridging, Routing, Propagation, Transformation and Monitoring of messages events in a customer's manufacturing system, for example. Also support can be provided for routing, data conversion, aggregation, and the like (e.g., third party and legacy systems can be integrated with public standards based interfaces.) Such message engines within an architecture of an industrial system enhances performance and facilitates system wide configuration/management.

Moreover, the HMI 820 can employ the directory interface 840 to point to data located within the system 800. An HMI can be employed to graphically display various aspects of a process, system, factory, and the like to provide a simplistic or user-friendly view of the system. Accordingly, various data points within a system can be displayed as graphical (e.g., bitmaps, jpegs, vector based graphics, clip art and the like) representations with desired color schemes, animation, and layout.

The HMI 820 can request data to have particular visualization attributes associated with data in order to easily display such data to the HMI 820. For example, the HMI 820 can query the directory interface 840 for a particular data point that has associated visualization attributes. The directory interface 840 can determine the proxy server 880 contains the attributed data point with the desired visualization attributes. For instance, the attributed data point can have a particular graphic that is either referenced or sent along with the data such that this graphic appears within the HMI environment instead of or along with the data value.

As explained earlier, the PLC 830 can be any number of models such as Allen Bradley PLC5, SLC-500, MicoLogix, and the like. The PLC 830 is generally defined as a specialized device employed to provide high-speed, low-level control of a process and/or system. The PLC 830 can be programmed using ladder logic or some form of structured language. Typically, a PLC can utilize data directly from a data source (e.g., data source 860) that can be a sensor, encoder, measurement sensor, switch, valve and the like. The data source 860 can provide data to a register in a PLC and such data can be stored in the PLC if desired. Additionally or alternatively, data can be updated (e.g., based on a clock cycle) or output to other devices for further processing.

Figure 9:
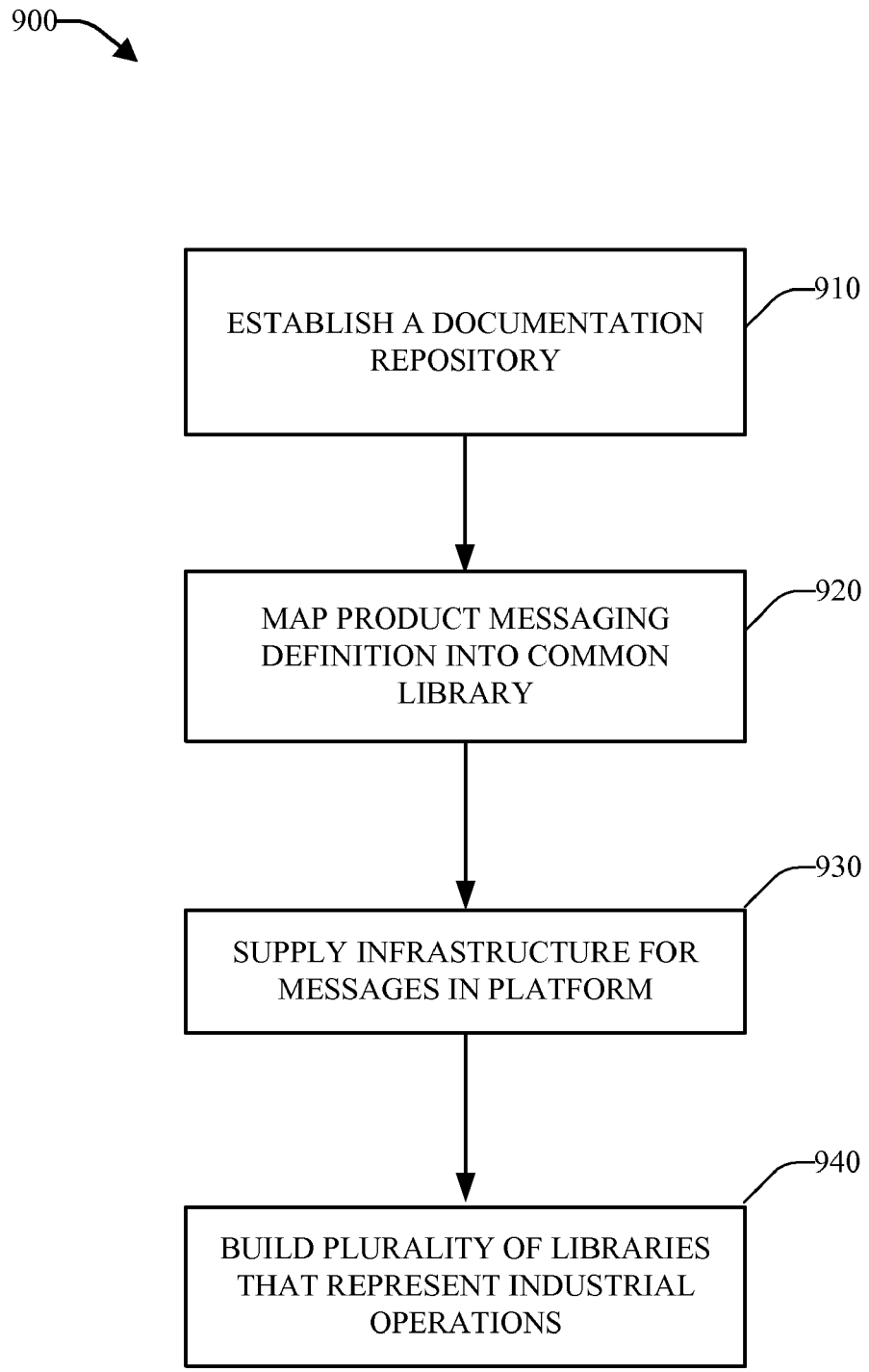
FIG. 9 illustrates a methodology of message exchange in accordance with an aspect of the subject innovation.

FIG. 9 illustrates a methodology of message exchange in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 910 a documentation repository for messages, events, commands and alarms can be established for the industrial setting. For example, an alarm can include as a specialization of condition event. The initiation of an alarm can occur via an alarm event, and a message that carries the alarm to the receiver can signify an alarm message. Likewise, an activity can occur at a given point in time in the system, wherein an automation product generates and receives events. The information associated with an event can be transmitted as a message between source and receiver of event information. In addition, a command can include an order (request) that is sent from a source to a receiver to perform some specific function. The initiation of such order is via a command event, wherein a message that carries the command to the receiver is classified as a command message.

Next and at 920, product messaging definitions can be mapped into the common library. Accordingly, and at 930 associated infrastructure for managing messages and referencing message definitions in libraries by industrial products can be provided in the platform as UPM structures. Next, and at 940 a plurality of libraries can be built that represent various industrial operations for the industrial setting. Such can facilitate communication (e.g., via preferred channels) to other services/products, wherein the configuration and management of messaging is consistent across the system.

Figure 10:
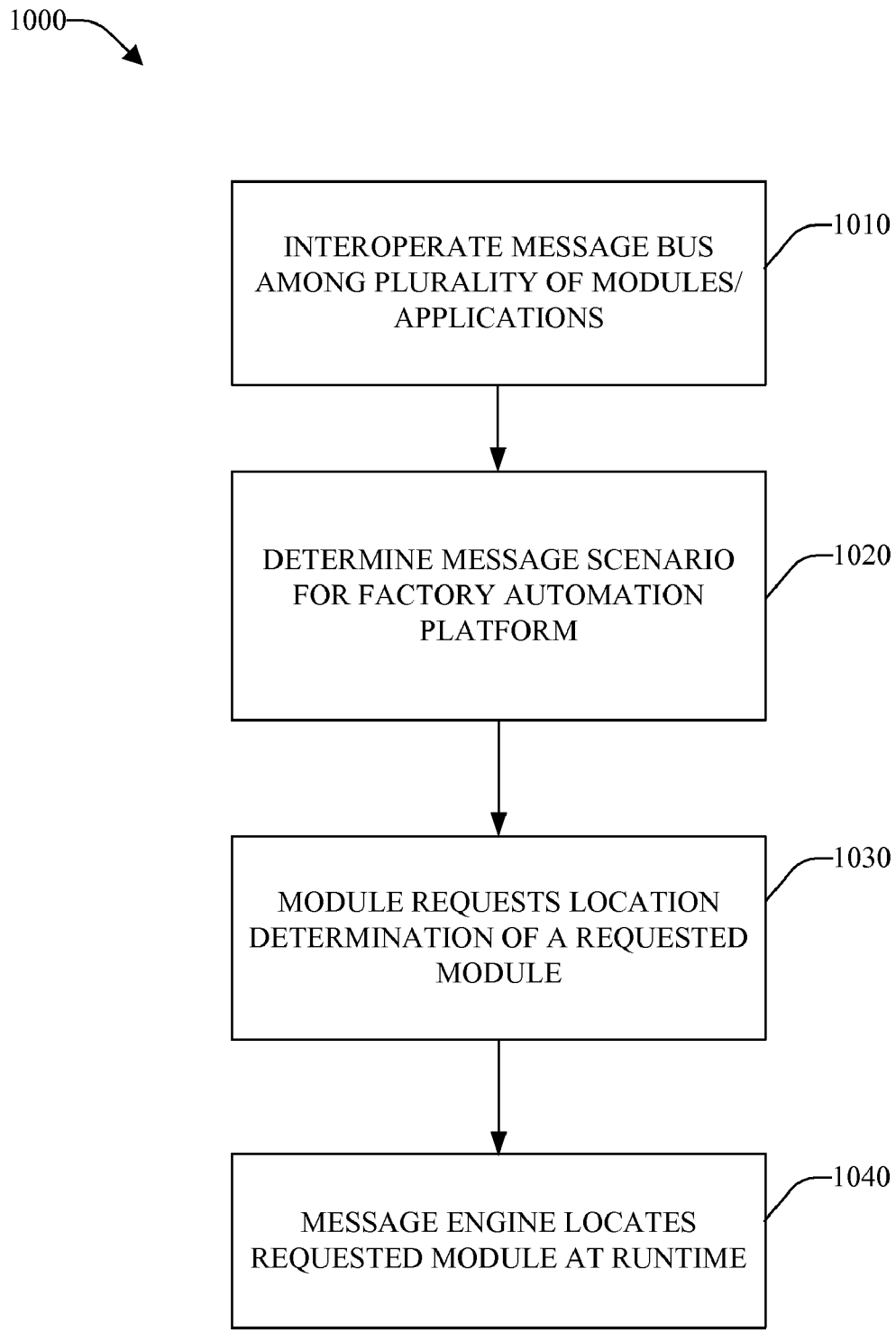
FIG. 10 illustrates a related methodology of facilitating message exchange as part of a factory automation platform.

FIG. 10 illustrates a related methodology of facilitating message exchange as part of a factory automation platform. Initially and at 1010, a message bus that interacts with message engines is interoperated among a plurality of modules and applications. Such message engines can leverage directory and other UPM services to locate other message engines and their configurations as well as supported messages. The message engine(s) activities can relate to Filtering, Bridging, Routing, Propagation, Transformation and Monitoring of messages events in a customer's manufacturing system, for example. Next, and at 1020 message engine scenarios can be determined for the factory automation platform, wherein these scenarios can be employed to map third party product/devices with the factory automation platform. Subsequently, and at 1030 a module requests location determination of a requested module at runtime. At 1040, the message engine can locate the requested module at run time. Thus binding can occur at runtime. Moreover, an equipment module can then find desired control modules at run-time, or at deployment time. As another example, a material traceability application can discover available material and the manner that such material can be moved, and provide a model for industrial operation based in part on linkages provided among various application/modules, the manner the equipment is connected and the like; (and in general without a user explaining the industrial operation layout for the equipment module.)

Figure 11:
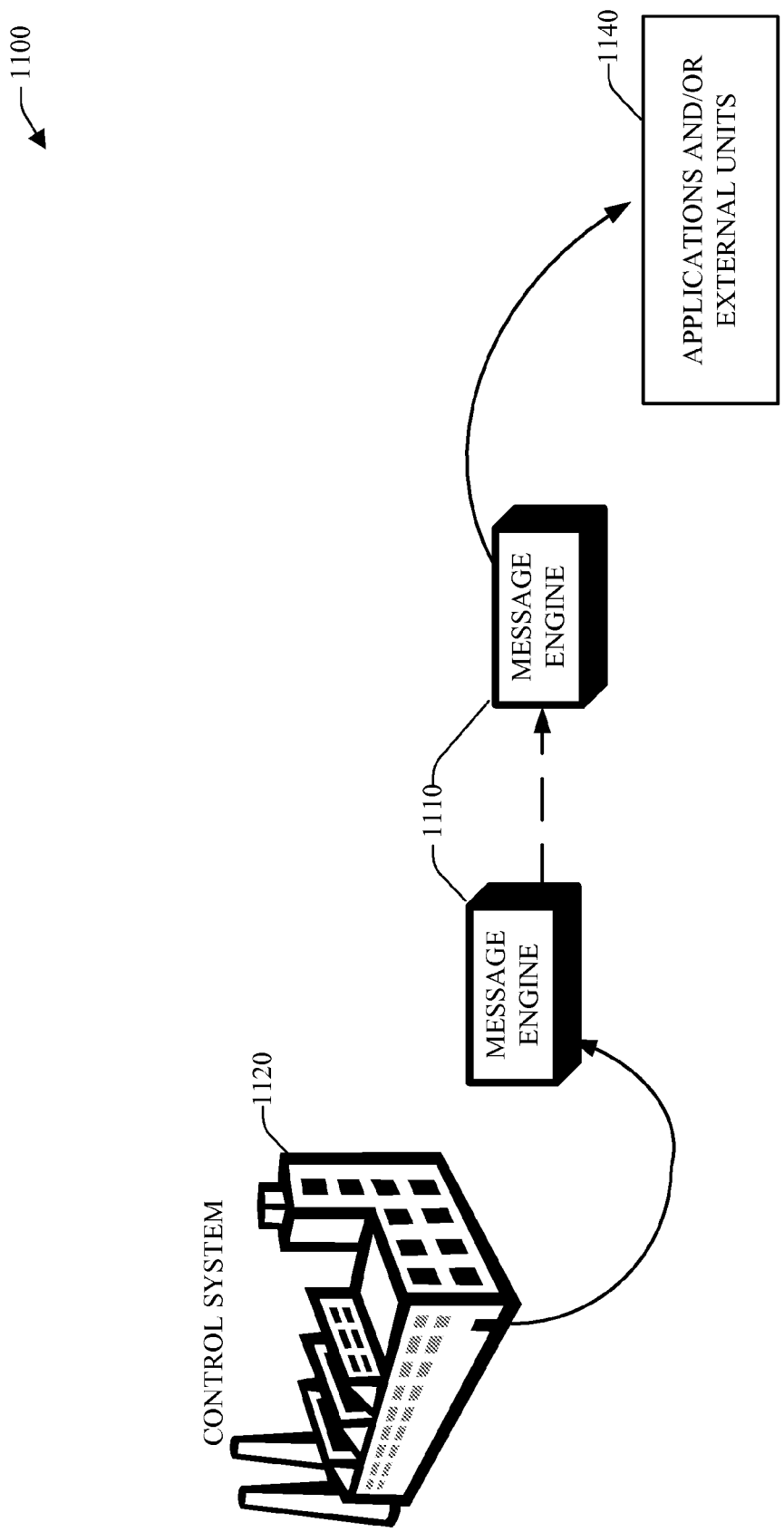
FIG. 11 illustrates an exemplary messaging exchange between control systems and applications, via a message engine in accordance with an aspect of the subject innovation.

FIG. 11 illustrates an exemplary messaging exchange between control systems and applications (e.g., software applications), via a message engine in accordance with an aspect of the subject innovation. The system 1100 facilitates messaging with and/or within an industrial automation environment. The system 1100 includes a message broker engine(s) 1110, which that normalizes messaging of various messaging protocols and formats, and supplies a mechanism to reliably exchange messages (e.g., information, data, requests, queries, control signals, and the like) with a control system 1120. For example, in one aspect, the message engine(s) 1110 can function as an application interface and provide common access points between applications (e.g., 1120 and 1140.) As illustrated, in the messaging exchange system 1100 applications can interact with messaging systems by interfaces exposed by the message engines (1110), wherein such message engine(s) exchange information between sender and receiver. As such, the presentation of the messaging infrastructure can be consistent with each user's role and location.

For example, the control program associated with the control system 1120 can send a message via the 'SendMessage' instruction and the software application receives a message via a 'ReceiveMessage' function. Conversely a software application (e.g., within 1140) can send a message via a 'SendMessage' function and the control program of the control system 1120 receives a message via the 'ReceiveMessage' instruction. The systems can also employ a same set of application level constructs. It is to be appreciated that the messaging infrastructure can vary in functionality, and various levels of functionality can be provided depending on the host environments and associated system. Moreover, each messaging level can support a support a common configuration interface and presentation of public interfaces, allowing consistent presentation of management consoles for messaging across the system. Hence, at each level, message engines 1110 can provide consistent external interfaces to products at that level and can bridge across to other networks providing the necessary data/security mappings and conversions between the networks. Moreover, data can be replicated across applications in the same machine or across machines.

As illustrated in FIG. 11, the UPM messaging of the subject innovation provides the plumbing to enable this via a consistent suite of interfaces. For example, the user interface settings in the system can generate configurations for messaging components that replicate data between the system components. The message system provides the replication capability and can generate status information on the success and frequency of the replication.

Message engine(s) 1110 can also provide for reliable messaging by behaving as a flexible data store. For example, any message transmitted by a component of the control system 1120 that is granted write and/or read privileges can be stored within and/or retrieved from the message engine (s) 1110. Likewise, any message transmitted to the control system 1120 by a component with write and/or read privileges can be stored within and/or retrieved from the message engine(s) 1110. Thus, transmission of a message can be independent of a state of a recipient (e.g., an entity external to the control system 1120), and/or receipt of the message can be independent of a state of a sender (e.g., an entity external to the control environment and/or one or more components of the control system 1120); and, thus, messages can be reliably exchanged (e.g., synchronously or asynchronously) regardless of whether both the sender and the recipient are concurrently available to interact and/or exchange data.

Such an arrangement for message exchange can include a 1 to 1 (1:1), 1 to many (1:n, n being an integer), or many to 1 (n:1) ratios of message senders and receives, and various levels of quality of service (QOS) including volatile messages such as "fire and forget," which is send once with no guarantee of delivery, and non-volatile messaging such as send with guaranteed delivery. Other arrangements such as sent or received multiple times, and send once and only once with guarantee of delivery only once, are well within the realm of the invention. Accordingly, such messaging engines can facilitate communication (e.g., via preferred channels) to other services/products, wherein the configuration and management of messaging is consistent across the system.

The message engine(s) 1120 can also reside within the control system 1120 (e.g., within an associated industrial controller.) Moreover, the message engine 1110 can reside in connection with a Human Machine Interface (HMI), an I/O module, a bridge, an I/O block, and the like. Moreover, the applications(s)/external unit 1140 can be further associated with a state machine, a robot, a subscriber, a database, a server, a client, an integration server, an Enterprise Resource Planning (ERP), a Manufacturing Execution System (MES), and a Machine Control (MC) system. In addition, the external entities can include one or more business systems and/or applications. Such systems and/or applications can be associated with one or more integration servers, middleware and/or other components that can communicate with the control system 1120. The message engine(s) 1110 can supply a common configuration of quality (e.g., events, command, event, alarm, scenarios, transactions and messages) and provide support for a reference and self-describing messaging.

Moreover, the sender of the message may or may not know that the message is routed through the message engine 1110. For example, the sender can transmit a general broadcast or specify a destination. Upon transmission, typically the sender need not know that the message is received and/or stored within the message engine 1110 before being conveyed to the destination.

Conversely, in other aspects of the subject innovation, the sender knows the routing path is through the message engine 1110. Moreover, the message engine(s) can leverage directory and other UPM services to locate other message engines and their configurations as well as supported messages. Such information can further reduce the glue code in configuring and managing the system as message engines can determine the appropriate mapping and routing of messages through the system. In a related example, the control system 1120 can execute (e.g., invoke, instantiate an instance thereof . . . ) a reliable message instruction that determines the location of the message engine 1110, can establish a connection with such message engine (e.g., employs a cached connection or pool of connections), delivers the message to the message engine 1110, and/or receives an acknowledgment from the message engine 1110 regarding the message transmission.

Such approach can further be employed within a publish/subscribe and/or a polling based messaging system, for example. With a publish/subscribe based system, the message can be associated with one or more recipients, including any or all recipients subscribed to receive the message and/or read messages posted in a particular message storage region such as a topic, a queue, a mailbox, and the like. The message engine(s) 1110 can transmit an event and/or a notification to such subscribers (or a generic broadcast) to apprise them that a message has been posted, published, and establish, or utilize an connection with the subscriber and send them the data, queue the data until the subscriber is available again according to a retention policy, and the like. Publishers and subscribers can maintain a connection to the message engine 1110, with subscribers pending on a specific message queue, or one to many information topic(s). Accordingly, when a publisher posts a message to a queue or topic, all of the subscribers are immediately notified and can receive the actual message as part of the notification. Also, a subscriber can request the message engine 1110 to provide a higher level of service and ask the message engine 1110 to queue the subscriber's messages if it is offline. With this type of service, a subscriber can be assured not to miss important messages even when the network connection is intermittent.

The publishers, subscribers and brokers can negotiate amongst each other to establish the most efficient and highest performance data transmission mechanism. Examples include choosing faster network links, aggregation of data messages (e.g., offer to produce one larger message with two topics instead of two separate messages), and unicast or multicast, or broadcast messages when desirable, and redirection to higher performance servers. A client can request the message engine 1110 only send messages based upon a qualification, send messages with a minimum time delay between transmissions, group multiple messages together in batches, delete unhandled messages after elapsed time (e.g., 24 hrs), forward to another queue after elapsed time (e.g. 10 minutes before forward to escalation queue or garbage), and the like. Also, one or more of the subscribers can concurrently and/or serially access the stored message. Such access can include, reading, copying, modifying, removing, deleting, popping, and the like. With a polling based system, the recipient can periodically poll the message engine 1110 to determine whether a message is available to be read and/or retrieved.

In a related aspect one or more of the recipients can concurrently and/or serially poll and access the stored message. In another instance, a point-to-point technique can be employed, wherein a recipient handles (e.g., extracts, copies, removes, and the like) a message from the message engine(s) 1110. In addition, a common view to system information (e.g., for proprietary and third party legacy) with additional perspective(s) of messaging system can be enabled via such message engine(s) 1110. The message engine(s) activities can facilitate: Filtering, Bridging, Routing, Propagation, Transformation and Monitoring of messages events in a customer's manufacturing system, for example. Also support can be provided for routing, data conversion, aggregation, and the like (e.g., third party and legacy systems can be integrated with public standards based interfaces.) Such message engine(s) 1110 within an architecture of an industrial system enhances performance and facilitates system wide configuration/management.

Likewise, the control system 1120 can include one or more control systems (not shown), wherein respective control systems can include one or more industrial controllers (not shown) that can control various plants, machines, apparatuses, processes, systems, equipment, and the like. In addition, the one or more industrial controllers can execute one or more intelligent agents and/or control logic (e.g., programs, routines, instruction sets, and the like, programmed in industrial and/or other languages) to control the various plants, machines, apparatus, processes, systems, equipment, and the like. Such control can include an ability to obtain and/or analyze inputs and/or generate outputs that effectuate the controlled plants, machines, apparatuses, processes, systems, equipment, and the like. Furthermore, the one or more controllers can include one or more receiving, transmitting and/or transceiving components (not shown), which can facilitate exchanging messages. Moreover, the message engine 1110 and/or any of the components of the control system 1120 can be hardware, software and/or firmware based. For example, industrial controllers within the control environment can be soft (e.g., software implemented) and/or physical controllers (e.g., hardware with suitable software and/or firmware), include Ethernet interfaces or interface with Ethernet interfaces over backplane or other network connections, human machine interface and I/O module devices, and/or a combination thereof.

Furthermore, the control system 1120 can be associated with any suitable communications protocol; such as Control and Information Protocol (CIP) protocols for communicating via DeviceNet, ControlNet, EtherNet/IP and/or Controller Area Network (CAN), fieldbus protocols for communicating via Profibus, Interbus-S, RIP, P-Net, and AS-i, Transport Control Protocol (TCP) and Internet Protocol (IP) for communicating via the Internet, NetBios Extended User Interface (NetBEUI) for communicating via Large and Wide Area Networks (LANs and WANs), File Transfer Protocol (FTP) for communicating with workstations, servers and the like, Hyper Text Transfer Protocol (HTTP) for communicating via the World Wide Web (WWW), and the like. In addition, communication with the message engine 1110 can be through wire and/or wireless communication techniques. Examples of communications schemes that can be employed in accordance with the subject invention include Ethernet, serial port, parallel port, coaxial cable, Infrared (IR), BlueTooth, Universal Serial Bus (USB), Firewire, WiFi, WiMax, 802.11 A, B, G, 802.15.4, Universal Plug and Play (UPnP), Ultra WideBand (UWB) and the like. Examples of suitable communications mediums include category 1-5 wire (e.g., CAT5 UTP 8-wire cable), coaxial cable, USB, RS-232, RS-485, and the like.

Moreover, the message engine 1110 can incorporate a memory or any suitable storage medium. For example, the message engine 1110 can include nonvolatile and/or volatile memory or storage. Suitable nonvolatile memory can include read only memory (ROM), programmable ROM (PROM), electrically programmable ROM (EPROM), electrically erasable programmable ROM (EEPROM), battery backed RAM, MRAM or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM), battery backed RAM. Storage can include disk drives, both mechanical and solid state such as SATA/IDE/SCSI disk drives, micro drives, USB and compact flash devices, and remote storage like network file system (NFS), common internet file system (CIFS) shares, storage area networks (SAN), network attached storage (NAS), and iSCSI interfaces, for example.

Figure 12:
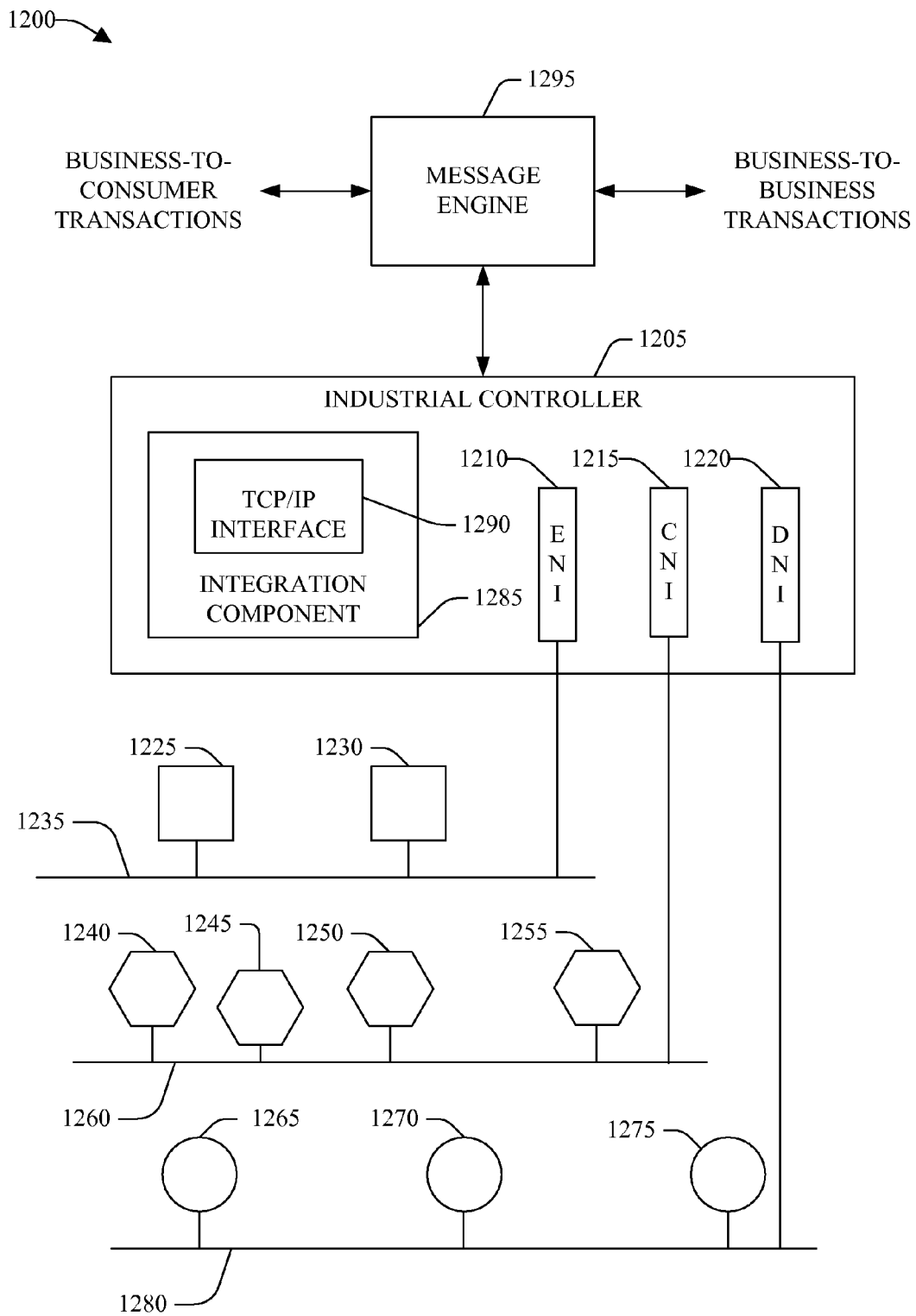
FIG. 12 illustrates a system that exchange messages between control and business systems through a message engine.

FIG. 12 illustrates a system 1200 that exchange messages between control and business systems through a message engine. The system 1200 includes an industrial controller 1205 with an Ethernet/IP interface 1210, a ControlNet interface 1215 and a DeviceNet interface 1220. The Ethernet/IP interface provides for communication with a device 1225 and a device 1230 residing on an Ethernet/IP network 1235. The ControlNet interface 1215 provides for communication with non-TCP/IP based devices 1240, 1245, 1250 and 1255 (collectively referred to hereafter as devices 1240-1255) residing on a ControlNet network 1260. The DeviceNet interface 1220 provides for communication with non-TCP/IP based devices 1265, 1270 and 1275 (collectively referred to hereafter as devices 1265-1275) residing on a DeviceNet network 1280. The devices 1225, 1230, 1240-1255 and 1265-1275 can be utilized to control various industrial processes, machines, manufacturing equipment, plants, and the like and can include input, output, memory and processing modules to facilitate control. Respective controllers can execute control programs, routines, instruction sets, and the like, which obtain and/or analyze inputs and/or generate outputs that effectuate the controlled entity (e.g., a motor, a drive, a valve, a solenoid, a switch . . . ). Such control programs can be programmed in essentially any programming language including industrial control languages (e.g., ST, SFC, FBD, IL and LD), C, C++, C#, GML, Java, Flow-Charts, etc., and/or any combination thereof, and/or include new instructions for the purpose synchronous data movement and/or performing transactions and/or event based tasks. These event based tasks can be configured to block and wait on the reception of a new message, or a message delivery.

The industrial controller 1205 further includes an integration component 1285 with a TCP/IP adapter 1290, which can provide a TCP/IP gateway between the devices 1225, 1230, 1240-1255 and 1265-1275 and the message engine 1295. The message engine 1295 can be a computer, server, cluster, or service oriented architecture (SOA) designed and utilized to couple and facilitate interaction between business and/or consumer trading partners. By way of example, two businesses that employ disparate operating systems and/or applications can utilize the message engine 1295 to exchange messages across internal and external networked computer systems. Likewise, a consumer and a business can utilize an message engine 1295 for interaction between different systems. Commerce between business partners generally is referred to as business-to-business (B2B) commerce and typically includes transactions between two businesses exchanging funds, goods, services and/or data. Commerce between a business and a consumer generally is referred to as business-to-consumer (B2C) commerce and commonly encompasses transactions such as the exchange of services, information and/or products. The message engine 1295 can act as a data switch with adapters for the various platforms and/or application interfaces.

It is to be appreciated that the message engine 1295 can be designed to support various prepackaged, customized, and/or legacy applications. Such applications can be designed based on standards such as XML, HTTP, JMS, SOAP, LDAP, WS-*, and the like. In addition, both hub-and-spoke based servers and network-centric based integration servers can be employed in accordance with aspects of the subject invention. In general, with hub-and-spoke based integration servers, applications connect through a central server, which manages communication, data translation, and process interactions among the connected systems and applications. With network-centric bus based integration servers, nodes are linked along a common backbone, and communication between interconnected systems and applications travel along the backbone to the integration server that handles the data transformation, translation, and routing to the receiving nodes.

In addition, the TCP/IP adapter 1290 can provide a TCP/IP gateway between the devices 1225, 1230, 1240-1255 and 1265-1275 and the message engine 1295. This gateway can be utilized as an Ethernet, a web, a file transfer, an HTTP, an HTTPS, an operating system and/or execution environment such as a Java virtual machine (JVM) and API. In addition, the gateway can provide for data transports and API such as JMS, JDBC, JTA, etc. Furthermore, the gateway can provide firewall and/or security capabilities such as SASL (e.g., Kerberos . . . ) and SSL between the controller 1205 and the message engine 1295, LDAP directory services and/or a reliable messaging interface. It should be appreciated that the component 1290, commonly referred to as the TCP/IP adapter, can represent communications components, which includes TCP/IP, UDP/IP, Multicast Ethernet protocols, including IPv4 and IPv6. Any of the devices 1225, 1230, 1240-1255 and 1265-1275 can utilize the integration component 1285 and the TCP/IP adapter 1290 to communicate with the message engine 1295, and to further communicate with the devices 1225, 1230, 1240-1255 and 1265-1275. This capability can be leveraged to mitigate any need for middleware and extra PC boxes and polling protocols, for example, as employed by conventional systems to facilitate such interaction. Communication between the devices 1225, 1230, 1240-1255 and 1265-1275 and the message engine 1295 can include, but is not limited to, serving up web based data (e.g., web pages, data views, XML, a web object, a CIP object . . . ), publishing information (e.g., messages, data, tags, status, state, error messages . . . ), subscribing to receive information, and/or polling for information. In addition, the communication can include downloading, launching, terminating, updating, pausing, monitoring and/or removing applications. Furthermore, suitable communication includes tunneling down to any of the 1225, 1230, 1240-1255 and 1265-1275 devices In order to provide additional context for implementing various aspects of the claimed subject matter, FIG. 13 and the following discussion is intended to provide a brief, general description of a suitable computing environment in conjunction with the controllers and/or UPM messaging structure, wherein the various aspects of the subject innovation may be implemented. While the subject innovation has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices. In a related aspect, in addition to an industrial setting having a limited number of units in a single site, the term "system" can also refer to manufacturing/information control settings that can encompass multiple sites in a global/distributed manufacturer.

Figure 13:
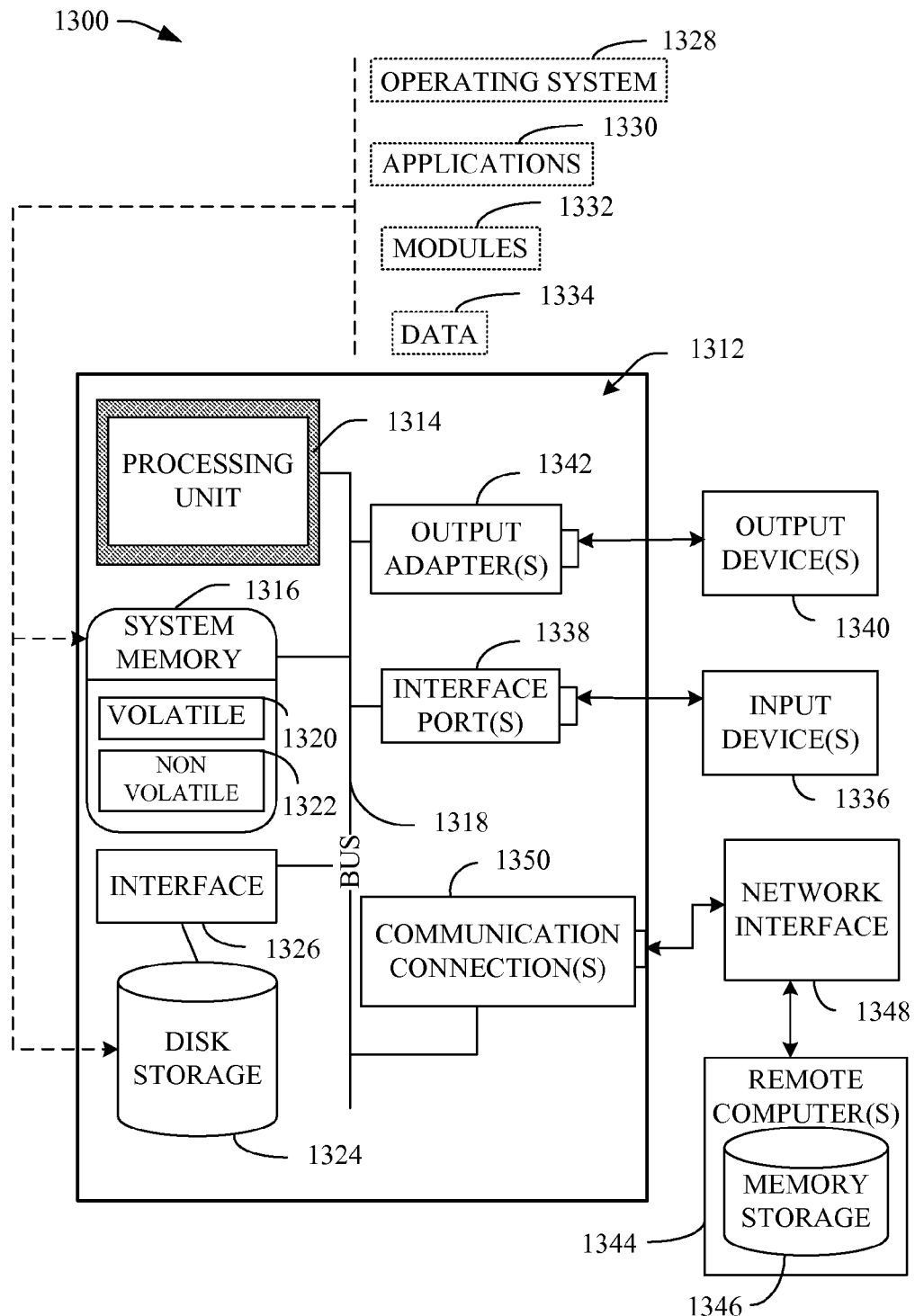
FIG. 13 illustrates an exemplary environment for implementing various aspects of the claimed subject matter includes a computer.

With reference to FIG. 13, an exemplary environment 1300 for implementing various aspects of the claimed subject matter includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), or flash memory. Volatile memory 1320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in the suitable operating environment 1300. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the claimed subject matter can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates locating components comprising:
    a processor;
    a memory communicatively coupled to the processor, the memory having stored thereon computer-executable instructions configured to implement the locating system including:
        a message engine that, at runtime, dynamically searches for and identifies a location of at least one module based at least in part on one or more audit messages that respectively comprise information relating to one or more modules including the at least one module, obtains data and a subset of attributes associated with the location of the at least one module, and provides the data and the subset of attributes associated with the location of the at least one module to a module, in response to a request for data contained in the at least one module, wherein the request is received from the module at runtime,
        wherein the message engine dynamically searches for and receives at least one audit message of the one or more audit messages, wherein the at least one audit message is associated with the at least one module and identifies the location of the at least one module, and
        wherein the message engine selects the location from a plurality of locations that contain data responsive to the request based at least in part on the subset of attributes which is associated with the data and the location, the subset of attributes at least comprises attributes requested in the request, wherein respective locations of the plurality of locations are respectively associated with respective subsets of attributes of a plurality of subsets of attributes, comprising the subset of attributes, and wherein information relating to the plurality of locations and respectively associated plurality of subsets of attributes is maintained in the one or more audit messages.

2. The system of claim 1, the message engine further comprises an adapter to provide communication with an Object Linking and Embedding (OLE) interface for process control (OPC).

3. The system of claim 1 further comprising a view that provides a perspective to system information, the view common to proprietary and third party legacy.

4. The system of claim 1 wherein the one or more audit messages, including the at least one audit message, are contained in an audit log, wherein at least a portion of the one or more audit messages is updated to be indicative of at least one of adding or removing one or more modules to or from one or more specified systems associated with a unified plant model.

5. The system of claim 1 further comprising a plurality of data brokers, comprising the at least one data broker, that facilitate search for the at least one module.

6. The system of claim 1, the message engine further comprising a registration component that registers applications with the message engine.

7. The system of claim 1, the message engine deployable based at least in part on quality of service metrics from an administration environment.

8. The system of claim 1, the message engine configurable based at least in part on quality of service metrics.

9. The system of claim 1 further comprising a library that contains data for representation of industrial operations.

10. The system of claim 1, the message engine has an application interface that provides common access points between applications.

11. The system of claim 1 further comprising a management interface that is common to an integrator component and a historian that form part of a unified plant model.

12. The system of claim 1, the message engine sited in an industrial controller.

13. The system of claim 1 further comprising indexing agents that facilitate search of configuration data.

14. The system of claim 1, further comprising open standard interfaces for communication to third party products.

15. A method of message module location within an industrial plant comprising:
employing at least one processor to facilitate execution of code instructions retained in a memory, the code instructions, in response to execution, perform acts comprising:
dynamically searching for a location of a module at runtime in response to a search request for the module received from a requestor;
dynamically searching for at least one audit message of one or more audit messages maintained in an audit log, wherein the at least one audit message relates to the module and identifies a location of the module, the module comprising data responsive to the search request;
dynamically identifying the location of the module at runtime based at least in part on location information, which is associated with the module, that is included in the at least one audit message;
selecting the location of the module from a plurality of locations associated with a plurality of modules that contain data responsive to the search request based at least in part on a subset of attributes which is associated with the data and the location, wherein the subset of attributes at least comprises attributes requested in the search request, wherein respective locations of the plurality of locations are respectively associated with respective subsets of attributes of a plurality of subsets of attributes, comprising the subset of attributes, and wherein information relating to the plurality of locations and respectively associated plurality of subsets of attributes is maintained in the one of more messages in the audit log;
obtaining the data and the subset of attributes associated with the location from the location; and
providing the data and the subset of attributes associated with the location to the requestor.

16. The method of claim 15 further comprising determining appropriate mapping for routing messages.

17. The method of claim 15 further comprising incrementally integrating devices to the industrial plant for receiving messages.

18. The method of claim 15 further comprising interoperating a message bus among a plurality of modules and applications.

19. The method of claim 15 further comprising supplying Object Linking and Embedding interfaces for process control.

20. The method of claim 15 further comprising mitigating glue code in configuring and managing message exchange.

21. The method of claim 15 further comprising referencing message definitions in libraries.

22. The method of claim 21 further comprising building libraries that represent industrial operations for the industrial plant.

23. The method of claim 21 further comprising managing exchanged messages consistently across the system.

24. The method of claim 20 further comprising:
accumulating one or more attributes related to data associated with the search request during transmission in a network; and
adding the one or more attributes to the subset of attributes associated with the data during transmission of the data to one or more modules in the network to facilitate accumulating the one or more attributes.

25. The method of claim 21 further comprising searching based at least in part on a Quality of Service (QoS) criteria.

26. The method of claim 15 further comprising automatically consolidating searched scopes within merged scopes of the system.

27. A system that facilitates messaging comprising:
a processor;
a memory communicatively coupled to the processor, the memory having stored therein computer-executable instructions configured to implement the messaging system including:
a message engine that
dynamically searches for and identifies location of a module at runtime based at least in part on location information associated with the module that is contained in at least one audit message of one or more audit messages maintained in an audit log,
selects one location from a plurality of locations that each contain data responsive to a request for the module that is received from a requestor based at least in part on a subset of attributes which is associated with the data and the one location, the subset of attributes at least comprises attributes requested in the request, wherein respective locations of the plurality of locations are respectively associated with respective subsets of attributes of a plurality of subsets of attributes, comprising the subset of attributes, and wherein information relating to the plurality of locations and respectively associated plurality of subsets of attributes is maintained in the one or more messages in the audit log,
obtains the data and the subset of attributes associated with the one location from the module at the one location, and
provides the data and the subset of attributes associated with the one location to the requestor; and
a message bus that communicates with the message engine for data transfer among applications.

28. The computer implemented system of claim 27 further comprising a registration component to register the applications for exchange of messages via the message engine.

29. The computer implemented system of claim 27 further comprising a directory interface that facilitates identification of data with a network and application.

30. A system that facilitates module location within an industrial setting comprising:
a processor;
a memory communicatively coupled to the processor, the memory having stored therein computer-executable instructions configured to implement the messaging system including:
means for dynamically identifying location of a module by dynamically searching to locate the module at runtime in response to a search request from a requestor, based at least in part on location information, which is associated with the module, that is contained in at least one audit message of one or more audit messages maintained in an audit log, wherein the module comprises data responsive to the search request;
means for selecting one location from a plurality of locations that contain the data responsive to the search request based at least in part on a subset of attributes which is associated with the data and the one location, the subset of attributes at least comprises attributes requested in the search request, wherein respective locations of the plurality of locations are respectively associated with respective subsets of attributes of a plurality of subsets of attributes, comprising the subset of attributes, and wherein information relating to the plurality of locations and respectively associated plurality of subsets of attributes is maintained in the one or more messages in the audit log;

means for obtaining the data and the subset of attributes associated with the one location from the module at the one location; and means for providing the data and the subset of attributes associated with the one location to the requestor at runtime.

31. The system of claim 30 further comprising:
means for normalizing messaging of various protocols and formats within a unified plant model; and
means for indexing search queries to facilitate the search request from the means for normalizing.

32. The system of claim 1 further comprising:
at least one data broker that generates the audit log, comprising the one or more messages, wherein at least a portion of the one or more audit messages is updated to be indicative of at least one of adding or removing one or more modules to or from one or more specified systems associated with a unified plant model.

33. The system of claim 1 wherein the message engine normalizes messaging of various protocols and formats within the unified plant model, where the search for the location employs at least one of the following factors: type of module that made the request, location of the module that made the request, frequency of messages exchanged with the at least one module to be located, or format of data to be sent.

* * * * *